United States Patent
Patel et al.

(10) Patent No.: US 10,986,201 B2
(45) Date of Patent: Apr. 20, 2021

(54) UNIFYING PRESENCE DATA AND COMMUNICATION ROUTING BASED THEREON

(71) Applicant: Avaya Inc., Santa Clara, CA (US)

(72) Inventors: Chirag Bharatkumar Patel, Pune (IN); Vishal Kamboj, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/543,266

(22) Filed: Aug. 16, 2019

(65) Prior Publication Data

US 2021/0051207 A1    Feb. 18, 2021

(51) Int. Cl.
*H04L 29/08* (2006.01)
*H04L 12/58* (2006.01)
*G06F 40/205* (2020.01)

(52) U.S. Cl.
CPC .......... *H04L 67/24* (2013.01); *G06F 40/205* (2020.01); *H04L 51/046* (2013.01); *H04L 67/26* (2013.01)

(58) Field of Classification Search
CPC .... G06Q 10/107; G06Q 10/109; G06Q 10/10; H04M 3/53383; H04M 1/72547; H04M 1/575; H04M 1/72566; H04M 1/72597; H04M 2201/60; H04M 2203/4536; H04M 3/50; H04M 3/53325; H04L 51/00; H04L 51/04; H04L 51/066; H04L 51/14; H04L 51/36; H04L 67/24
See application file for complete search history.

(56) References Cited

U.S. PATENT DOCUMENTS

| | | | | |
|---|---|---|---|---|
| 6,430,174 B1* | 8/2002 | Jennings | ........... | H04L 29/06027 370/352 |
| 6,640,230 B1* | 10/2003 | Alexander | ........... | G06Q 10/107 |
| 7,409,428 B1* | 8/2008 | Brabec | .................... | H04L 51/34 709/206 |
| 8,090,083 B2* | 1/2012 | Fong | .................... | H04M 3/5307 379/88.14 |
| 2002/0126679 A1* | 9/2002 | Morton | ............. | H04L 29/06027 370/401 |
| 2003/0046296 A1* | 3/2003 | Doss | ........................ | H04L 51/04 |
| 2004/0156484 A1* | 8/2004 | Amin | .................. | H04M 3/5307 379/88.14 |
| 2005/0141691 A1* | 6/2005 | Wengrovitz | ........ | H04M 3/5191 379/211.02 |
| 2005/0201533 A1* | 9/2005 | Emam | ................. | H04M 1/2535 379/88.19 |

(Continued)

*Primary Examiner* — David R Lazaro
(74) *Attorney, Agent, or Firm* — Sheridan Ross P.C.

(57) ABSTRACT

Maintaining accurate out-of-office notifications can be resource intensive and error-prone. This is compounded by duplicating efforts, such as between a telephony system and an email system. By automatically creating and presenting a personal interactive voice response (IVR) or dual-tone multi-frequency (DTMF) signaling in response to menu option, generated from an email system, a telephony system may automatically be updated to provide options for a caller to select delegates for a particular user. The delegates may further be identified by subject matter or other categorization. As a result, a user may maintain one system and, as a result, enable a second system to automatically present and process delegate selection without additional human input.

20 Claims, 5 Drawing Sheets

(56) References Cited

U.S. PATENT DOCUMENTS

| | | | |
|---|---|---|---|
| 2006/0031326 A1* | 2/2006 | Ovenden | G06Q 10/109 709/206 |
| 2006/0031340 A1* | 2/2006 | Mathew | H04L 51/14 709/206 |
| 2006/0075038 A1* | 4/2006 | Mason | H04L 51/00 709/206 |
| 2008/0235344 A1* | 9/2008 | Paul | G06Q 10/107 709/206 |
| 2009/0235280 A1* | 9/2009 | Tannier | G06Q 10/00 719/318 |
| 2010/0174787 A1* | 7/2010 | Gupta | G06Q 10/109 709/206 |
| 2010/0174896 A1* | 7/2010 | Gupta | G06F 8/65 713/100 |
| 2010/0175000 A1* | 7/2010 | Gupta | H04L 67/24 715/753 |
| 2018/0131647 A1* | 5/2018 | Nagesha | H04L 51/04 |
| 2018/0167341 A1* | 6/2018 | Bs | H04L 51/02 |

* cited by examiner

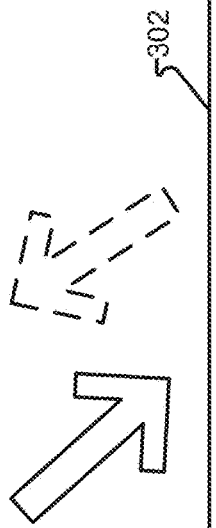

You have reached Hugh Mann. I'll be out of the office starting on the 6th and returning on the 22nd. I'm not in the office. I will not be checking messages until I return.

During my absence, you may contact the following:
For Product A, contact Alice at extension 1234.
For Product B, contact Bill at extension 1122;
For questions on an invoice, contact Ira at 2233; and
For everything else, contact Eva at 3344.

Hugh Mann will be out of the office starting on the 6th and returning on the 22nd. Please note that I will not check messages until my return.

Press 1 to leave a message.
For Product A questions, Press 2 for Alice;
For Product B questions, Press 3 for Bill;
For questions on an invoice, Press 4 for Ira; and
For everything else, Press 5.

To repeat these options, press 9.

Fig. 3

UNIFYING PRESENCE DATA AND COMMUNICATION ROUTING BASED THEREON

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for combining presence data from discrete systems and particularly to communication routing to a node selected in accordance with presence data.

BACKGROUND

Users often utilize out-of-office messages for their telephone and email applications to notify contacting parties that the user may be unresponsive or not view the message for a period of time. Out-of-office messages may also include alternative contacts, such as individuals to contact for a particular subjects or questions.

An email application may receive a message and automatically generate and send a reply to the sender notifying them that the recipient is out-of-office and optionally alternative contacts. Similarly, a telephone system may include out-of-office content in a greeting so that a caller may now that, should they leave a message, the recipient may not hear it for a period of time or others that may be contacted for a particular subject matter.

SUMMARY

A users may set an out-of-office auto-reply message in an email application or client, such as Microsoft Outlook, The out-of-office message may contain information about contacts/delegates that may be utilized in the absence of the user. Unified communication system combines two or more different communication mediums (e.g., voice telephony, email, text messaging, chat, co-browsing, video, etc.) into a presentation on a single device, although the presentation may utilize additional or alternative devices for convenience.

However, systems are discrete and, even with delegates identified in an email portion, do not affect the telephony portion such that calls received are not automatically connected to the endpoint (e.g., extension) of the user's intended contacts/delegates. User may need to setup different alternate contacts/delegates for different subject areas for out-of-office assistance and for each system. The process is duplicative and may result in errors or omissions. In such scenario, a person trying to reach out to the out-of-office user via extension call, which is absent a sufficient out-of-office greeting, will be unaware of the contacts/delegates available, even though they may have been provided by the user in their out-of-office auto-reply for emails.

In one embodiment, automated out-of-office assistance is provided when someone calls a user's extension during his/her out-of-office duration. Automatically set personalized assistance, such in a telephony system's interactive voice response (IVR) for a unified communication endpoint associated with a particular user's extension and connect the incoming calls to the appropriate extension based on caller's need/input, such as when called person has set out-of-office information in an email client.

In one embodiment, provides for an automated personalized out-of-office assistance to automatically assist the initiator of a communication in connecting the call to the appropriate contact during the same call. Callers would be connected and avoid the need for additional calls, either in a mistaken attempt to reach the callee or to call a designate identified in an out-of-office meeting in a greeting. Here, a caller would be assisted so that the call will be directly connected to the appropriate extension.

In another embodiment, the unified communication system collects out-of-office information from an email systems auto-reply message and prepares the personized IVR with options to transfer the call to the out-of-office contacts. Calls made to the user's extension will be connected to this personalized IVR for smooth out-of-office assistance. Personalized IVR would help caller by providing options to reach out to the appropriate contacts in the absence of called user. Caller just need to supply DTMF input for transferring the call to the appropriate out-of-office extension.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a computer comprising at least one processor and memory accessible to the processor; a network interface to at least one network; a data storage; and wherein the at least one processor of the computer performs: accessing, in the data storage, a first record comprising a first out-of-office notification of a first user for a first application for communicating between nodes on a network utilizing a first type of communication; parsing the first record to identify therein, a first delegate; accessing a first address of the first delegate; and generating a second record comprising an out-of-office notification for a second application for communicating between nodes on a network utilizing a second type of communication, wherein the second out-of-office notification comprises a first option that when selected by a device of a second user, connects the device of the second user to the first address.

In another embodiment, a method is disclosed, comprising: accessing, in the data storage, a first record comprising a first out-of-office notification of a first user for a first application for communicating between nodes on a network utilizing a first type of communication; parsing the first record to identify therein, a first delegate; accessing a first address of the first delegate; generating a second record comprising an out-of-office notification for a second application for communicating between nodes on a network utilizing a second type of communication, wherein the second out-of-office notification comprises a first option; presenting, to a device of a second node, the out-of-office notification for the second application; and upon receiving the first option from the device of the second user, connecting the device of the second user to the first address.

In another embodiment, a system is disclosed comprising means to access, in a data storage, a first record comprising a first out-of-office notification of a first user for a first application for communicating between nodes on a network utilizing a first type of communication; means to parse the first record to identify therein, a first delegate; means to access a first address of the first delegate; means to generate a second record comprising an out-of-office notification for a second application for communicating between nodes on a network utilizing a second type of communication, wherein the second out-of-office notification comprises a first option; means to present, to a device of a second node, the out-of-office notification for the second application; and upon receiving the first option from the device of the second user, means to connect the device of the second user to the first address.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term means as used herein shall be given its broadest possible interpretation in accordance with 35 U.S.C., Section 112(1) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 3 depicts a second data conversion in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
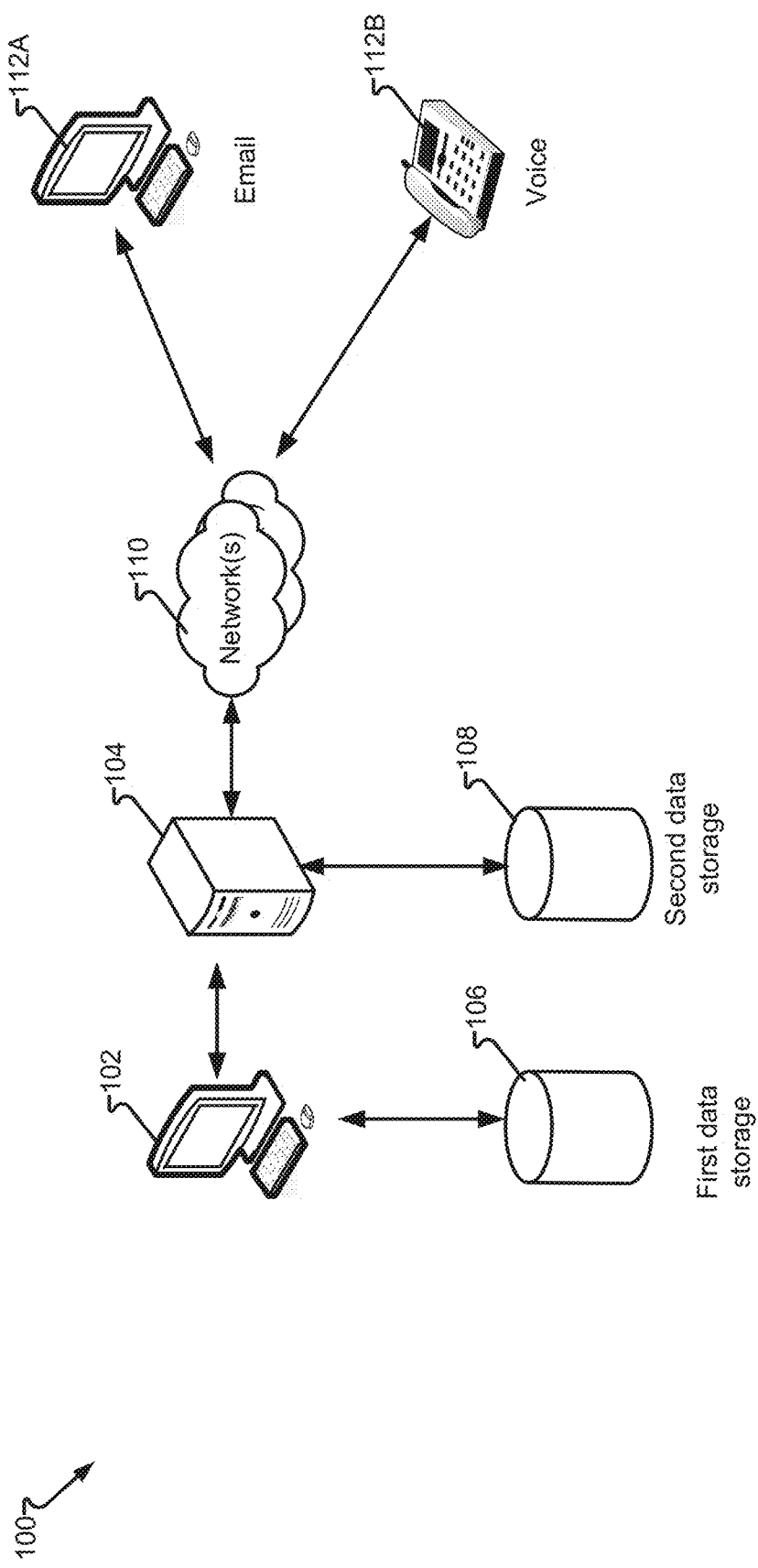
FIG. 1 depicts a first system in accordance with embodiments of the present disclosure.

FIG. 1 depicts system 100 in accordance with embodiments of the present disclosure. In one embodiment, system 100 comprises a number of discrete systems, including but not limited to, first device 102, server 104, first data storage 106, and second data storage 108. However, it should be appreciated that two or more components, including but not limiting all components, may be integrated together and/or comprised by a common component. System 100 utilizes a computer, such as server 104 or first device 102, to execute instructions via a configured processor executing algorithmic instructions. Accordingly, the computer (e.g., server 104, first device 102) comprises at least one processor and a memory accessible to the at least one processor and a network interface (e.g., network interface card, cabling, etc.) to enable communication with networked and/or attached devices.

In one embodiment, system 100 comprises first device 102 is utilized by a first user who has established an out-of-office auto-reply for a first application, such as an email application, such that users sending an email to the first user via email will receive a return email comprising the out-of-office auto-reply. First data storage 106 may be associated with data associated with the first application including the out-of-office auto-replay associated with the first application.

In another embodiment, server 104 accesses a record within first data storage 106 comprising the out-of-office auto-reply for the first application. Server 104 accesses the record and generates therefrom a second out-of-office reply for a second application, such as may be maintained by second data storage 108. In one embodiment, the first application comprises an email application and the second application comprise a telephony application. Accordingly, the second out-of-office reply may comprise an announcement, such as a greeting, comprising options selectable via an interactive voice response (IVR) and/or dual-tone multi-frequency (DTMF). The announcement may comprise an itemization of the list of options and prompt a user of the second application (e.g., a caller) to select one of the options by providing a spoken or touch-tone input.

Server 104 may convert the first out-of-office auto-replay message to spoke form without modification. In another embodiment, server 104 may provide at least one substitution based upon a record entry, such as a use preference. For example, an email out-of-office auto-reply, like other emails, may comprise the user's name, email address, or other identifier. Accordingly, out-of-office auto-reply, when utilizing with an email application, may utilize personal pronouns, such as "I" and, when converted to an audio announcement for a telephony system, may be substituted for the user's name. Other configurations may also be possible, such as a first announcement, and set of options, for internal or trusted sources and a second announcement, and set of options, for external or non-trusted sources.

A second user wishing to contact the first user may initiate contact via second user device 112 over network 110. It should be appreciated that network 110 may comprise a single network (e.g., Internet, intranet, etc.) or a plurality of networks (e.g., plain old telephone system (POTS), session initiation protocol (SIP) via Internet, cellular voice and/or data, etc.). Second device 112 may comprise a unitary device, such as a computer executing a unified communication application and therefore enabled to conduct communication using any one or more communication types (e.g., text messaging, voice, video, email, etc.). In another embodiment, second device 112 may be configured to conduct communications on only certain types of communications and networks. For example, second device 112B may be embodied as a voice-only telephone and utilize network 110 comprising POTS and second device 112A may be embodied as a text-only device (e.g., text chat, email) and utilizing network 110 comprising the internet. Accordingly, communication types may be utilized on communication networks, or portions thereof, for a particular communication type. Additionally or alternatively, server 104 may comprise a plurality of servers and/or other communication equipment (e.g., ports, network edge devices, routers, switches, etc.).

As a benefit of certain embodiments herein, a first user may have only established an out-of-office auto-reply for a first application, such as email, and a second user placing a voice call from second device 112B may be informed by server 104, of the absence of the first user and options to be connected to one or more delegate, all without requiring any human input beyond creating the first out-of-office auto-reply. Second data storage 108 may comprise text to be generated into speech and/or a selectable collection of pre-recorded spoken messages to be presented as out-of-office auto-reply by a telephony application.

Figure 2:
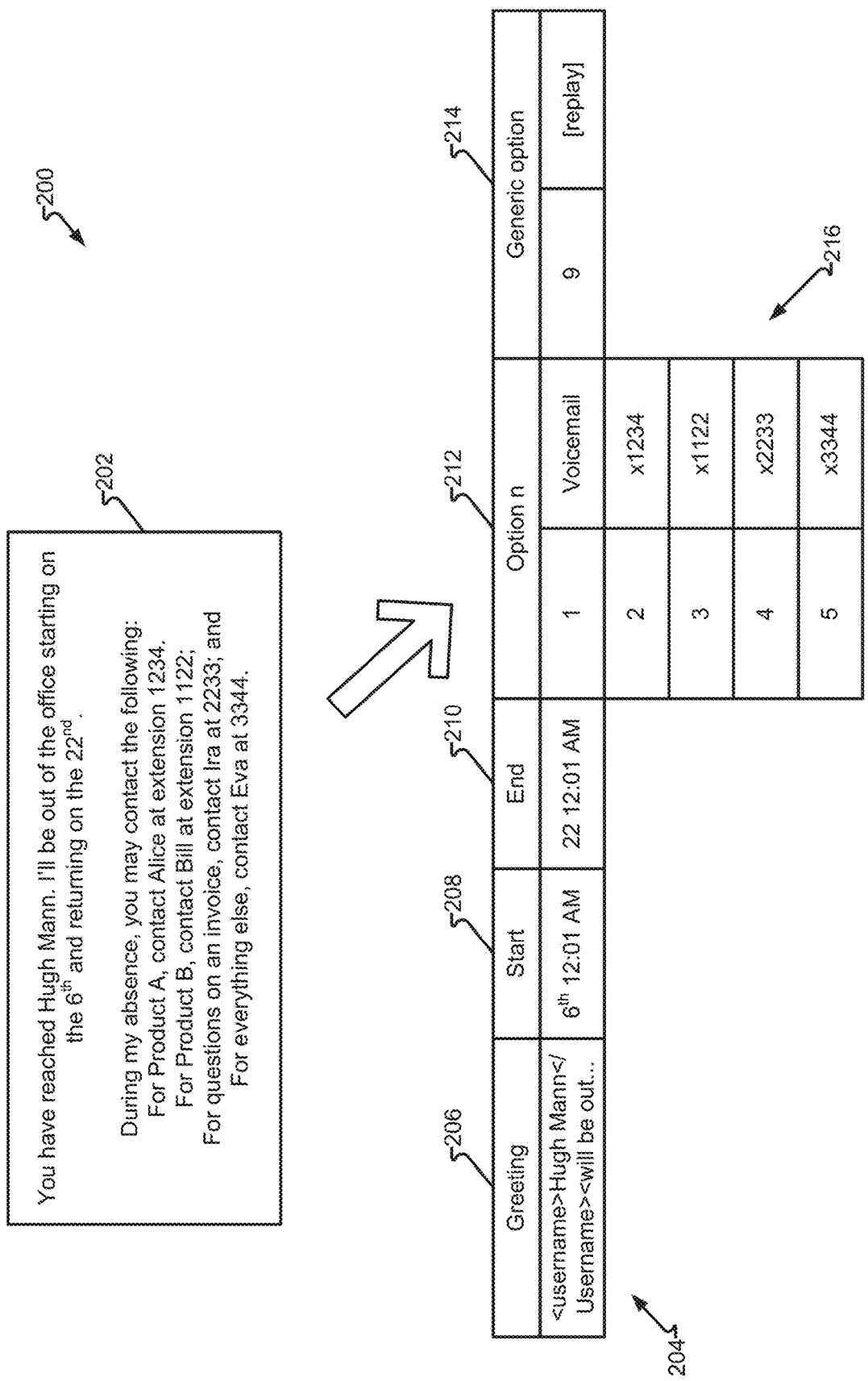
FIG. 2 depicts a first data conversion in accordance with embodiments of the present disclosure.

FIG. 2 depicts data conversion 200 in accordance with embodiments of the present disclosure. In one embodiment, a first user created out-of-office auto-reply 202 for a first application, such as text messaging system and/or email system. At least one processor, such as at least one processor of server 104, may create record 204 by parsing out-of-office auto-reply 202. In one embodiment, record 204 comprises greeting field 206, start time 208, end time 210, and may further comprise options 212 and/or generic option 214.

In one embodiment, greeting 206 is generated speech from out-of-office auto-reply 202 and may optionally include any modifications, such as replacing certain configured text values, such as use of "I" with a substitute value, such as the first user's name. Greeting 206 may be stored as text or other computer-readable format and generated "on the fly" in response to a caller, generated as speech from the text and stored as an audio file for playback to a caller, or a combination thereof, such as to store the out-of-office auto-reply 202 as text and, upon a first caller triggering the generation of speech from the text, storing the resulting audio file from the generated speech.

In another embodiment, a second caller may be presented with a covered (e.g., spoken/generated speech) version of out-of-office auto-reply 202 if calling at a time/date after the value maintained in start time field 208 and before the value maintained in the end field 210, otherwise presentation of out-of-office auto-reply may be omitted. The first user may have provided a number of delegates to contact which may be maintained as substructure 216. The addresses in substructure 216 may be provided by the first user in out-of-office auto-reply 202 or provided and/or confirmed via a lookup, such as server 104 accessing an address book or company directory. Additionally or alternatively, the format of the address may be altered based on the caller. For example, an internal caller may be connected to an address identified only as a four-digit extension, whereas an external caller may be connected to an address identified via fully qualified telephone number. Additionally or alternatively, record 204 may comprise one or more generic option 214, such as to provide navigation cue or default operation (e.g., "Press 0 or just remain on the line to be connected to . . . "), where a college, secretary, administrator, voicemail system, etc., may be provided when the second user fails to select an option provided by substructure 216.

FIG. 3 depicts data conversion 300 in accordance with embodiments of the present disclosure. As a benefit of embodiments provided herein, out-of-office auto-reply 202 is created by a first user for a first application, such as text (e.g., text chat, email) and automatically, and without human intervention, have created out-of-office auto-reply 302 for a second application, such as a telephony system (e.g., POTS, SIP, VoIP, etc.). In another embodiment, out-of-office auto-reply 302 may be provided (e.g., spoken) by a first user in a voice-based application (e.g., telephony) and cause at least one processor to create out-of-office auto-reply 202 in response thereto. For example, out-of-office auto-reply 302 may be converted to text via at least one processor of server 104 and, therefrom, out-of-office auto-reply 202 created for an email system, such as to populate out-of-office auto-reply 202 with email address, telephone numbers, or other options to contact delegates emailing the first user.

Figure 4:
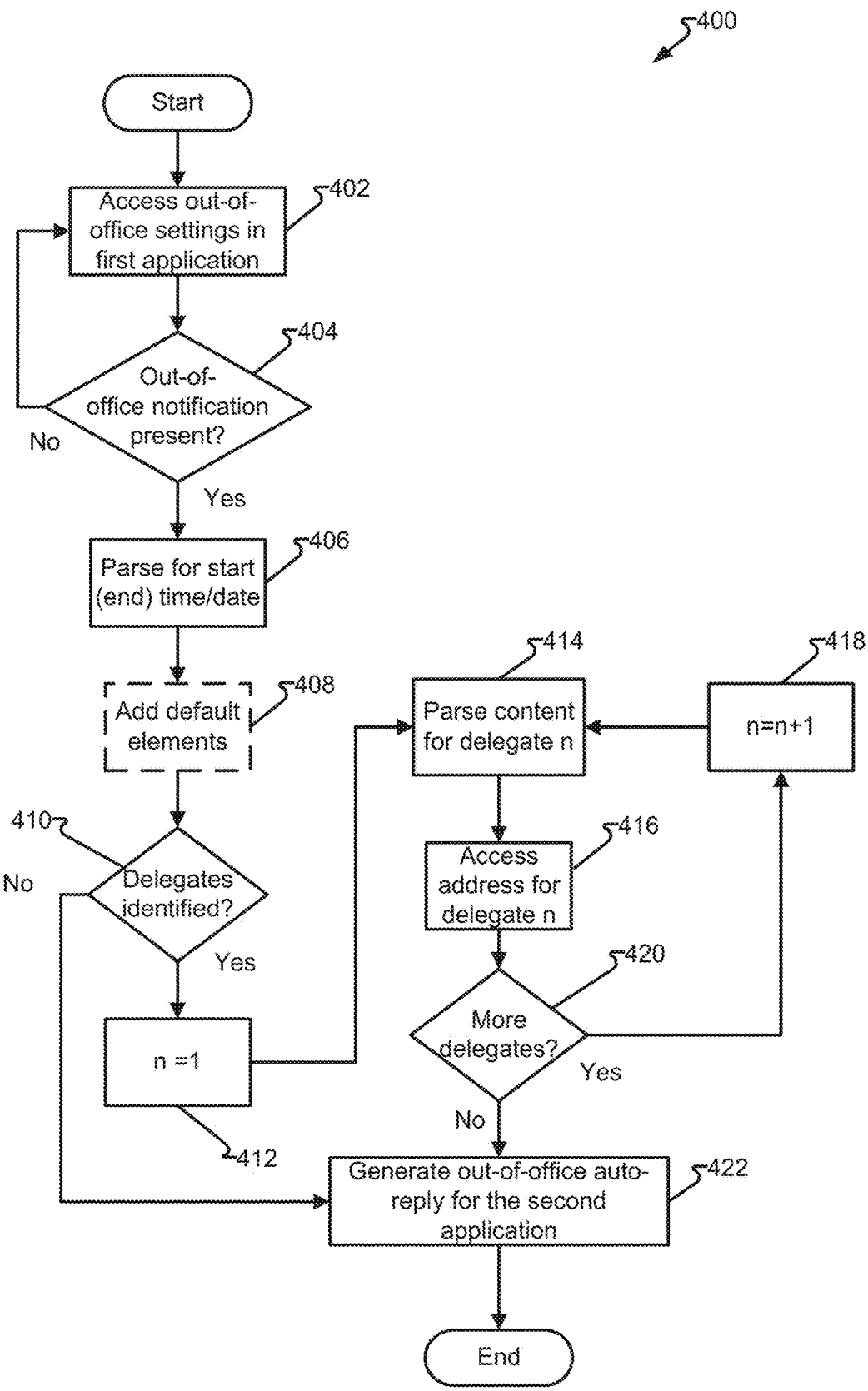
FIG. 4 depicts a process in accordance with embodiments of the present disclosure.

FIG. 4 depicts process 400 in accordance with embodiments of the present disclosure. In one embodiment, process 400 is executed by at least one processor of a computer, such as of first device 102 and/or server 104, executing machine-readable instructions comprising process 400. Process 400 may create a record, such as record 204 from which a second out-of-office auto-reply may be created, such as out-of-office auto-reply 302. It should be appreciated that alternative steps may be utilized without departing from the scope of the embodiments herein. For example, generally process 400 parses an out-of-office auto-reply for one application to create a data structure for use in creating an out-of-office auto-reply for a second application, including options to select delegates and their associated device addresses.

Process 400 begins and step 402 accesses an out-of-office auto-reply settings for a first user and associated with a first application for use in communicating via a first device, such as first device 102, in a first communication type, such as text over a communication network, such as network 110 operable to facilitate communicates between devices in the first communication type. Settings accessed in step 402 may comprise fields and/or settings indicating particular use and/or options for a user (e.g., If caller is internal, include option 4 to connect to the company president, otherwise include option 4 to connect to public relations.). Next, test 404 determines if an out-of-office auto-reply is present. If test 404 is determined in the negative, processing may loop back to step 402 or process 400 may end and optionally restarted at a later time.

Step 406 parses the out-of-office auto-reply found in test 404 to determine a start/end time/date for the out-of-office auto-reply to be utilized with incoming communications via the second application. Optionally step 408 adds any default elements. For example, all employees of a company may have a default option to allow callers to press "0" to reach a company operator. Test 410 determines if at least one delegate is identified. If test 410 is determined in the negative (e.g., a second out-of-office auto-reply only includes default elements), process 400 may continue to step 422, otherwise, processing continues to step 412 wherein a delegate index is initialized. Step 414 parses the out-of-office auto-reply found in test 404 for delegates. Step 416 access an address for the delegate. For example, a textual repetition of a delegate (e.g., an email address, name, etc.) may be utilized to access a telephone number associated with the second application. Step 416 determines if more delegates exist and, if yes, the index incremented in step 418 and processing continues back at step 414 for the next delegate. Upon test 420 being determined in the negative, step 422 generates the data structure to an out-of-office auto-reply for the second application (e.g., one or more audio files, modified text files, etc.) and may further signal the second application to include the generated second out-of-office auto-reply or otherwise cause the second application to present the generated out-of-office auto-reply to a second user when imitating a communication with the first user.

Figure 5:
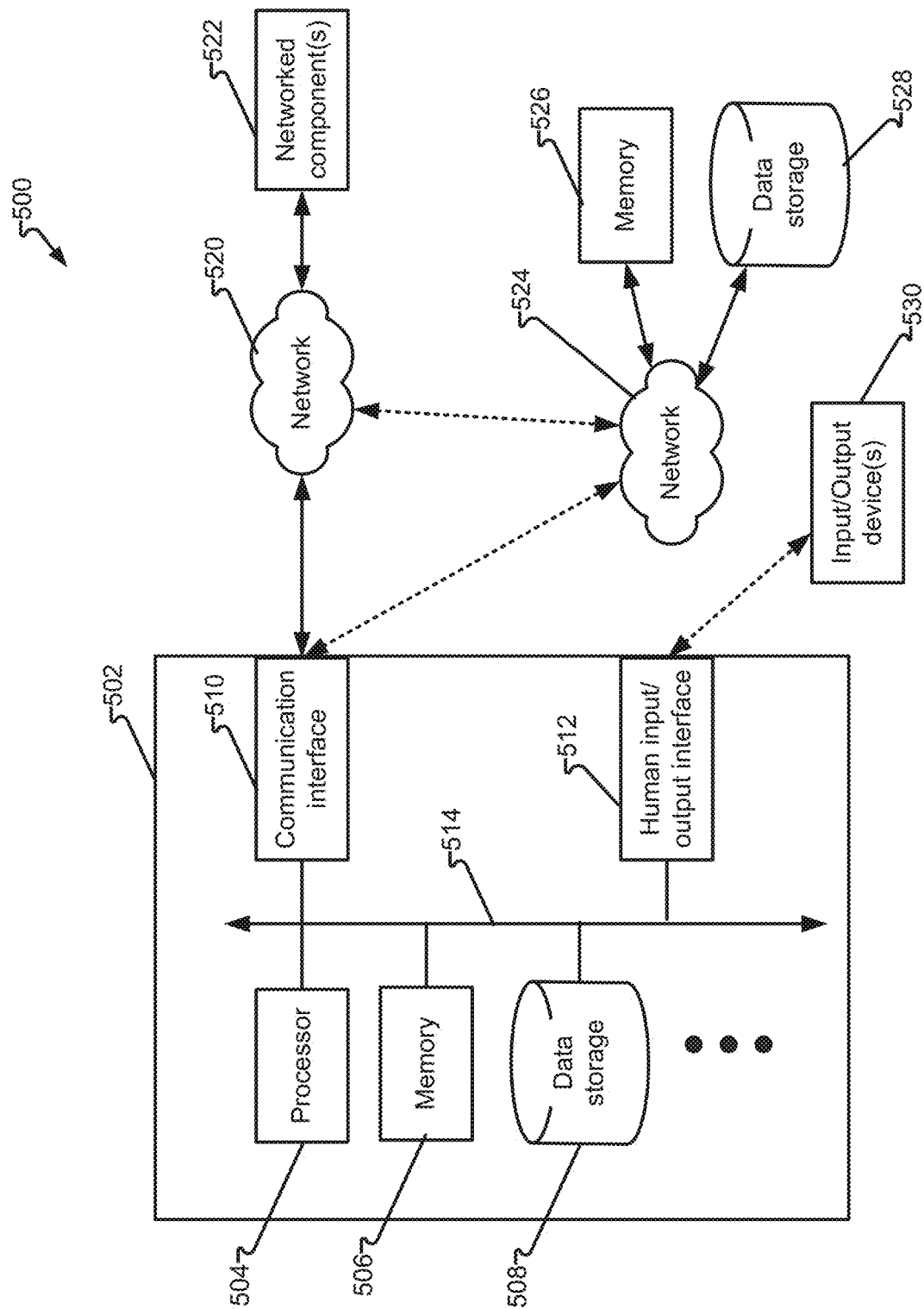
FIG. 5 depicts a second system in accordance with embodiments of the present disclosure.

FIG. 5 depicts a second system in accordance with embodiments of the present disclosure.

FIG. 5 depicts device 502 in system 500 in accordance with embodiments of the present disclosure. In one embodiment, a computer, such as first device 102 or server 104 may be embodied, in whole or in part, as device 502 comprising various components and connections to other components and/or systems. The components are variously embodied and may comprise processor 504. Processor 504 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via bus 514, executes instructions, and outputs data, again such as via bus 514.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, etc. In another embodiment, communication interface 510 may comprise, or be comprised by, input/output interface 512. Communication interface 510 may be configured to communicate directly with a networked component or utilize one or more networks, such as network 520 and/or network 524.

Network 110 may be embodied, in whole or in part, as network 520. Network 520 may be a wired network (e.g., Ethernet), wireless (e.g., WiFi, Bluetooth, cellular, etc.) network, or combination thereof and enable device 502 to communicate with network component(s) 522.

Additionally or alternatively, one or more other networks may be utilized. For example, network 524 may represent a second network, which may facilitate communication with components utilized by device 502. For example, network 524 may be an internal network to contact center #02 whereby components are trusted (or at least more so) that networked components 522, which may be connected to network 520 comprising a public network (e.g., Internet) that may not be as trusted. Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and allow device 502, and/or other devices, to access data thereon. Similarly, input/output device(s) 530 may be accessed by processor 504 via input/output interface 512 and/or via communication interface 510 either directly, via network 524, via network 520 alone (not shown), or via networks 524 and 520.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel®

Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a computer comprising at least one processor and memory accessible to the at least one processor;
    a network interface to at least one network;
    a data storage; and
    wherein the at least one processor of the computer performs:
        accessing, in the data storage, a first record comprising a first out-of-office notification of a first user for a first application for communicating between nodes on a network utilizing a first type of communication;
        parsing the first record to identify therein, a first delegate;
        accessing a first address of the first delegate;
        populating a first data structure having a first data field and a second data field, wherein the first data field is populated with an identity of the first delegate and the second data field is populated with the first address; and
        generating, from the first data structure, a second record comprising an out-of-office notification for a second application for communicating between the nodes on the network utilizing a second type of communication, wherein a second out-of-office notification comprises a first option determined from the first data field, that when selected by a device of a second user, connects the device of the second user to the first address of the second data field.

2. The system of claim 1, wherein the out-of-office notification for the second application is presented upon the device of the second user attempting to connect to a device of the first user.

3. The system of claim 2, wherein upon the device of the second user selecting the first option, disconnects the device of the second user from the device of the first user.

4. The system of claim 1, wherein the at least one processor of the computer performs parsing the first record to identify a plurality of delegates wherein ones of the plurality of delegates are associated with ones of a plurality of options.

5. The system of claim 4, wherein the second out-of-office notification comprises the plurality of options associated with ones of a plurality of addresses for nodes on a second network and further associated with the ones of the plurality of delegates.

6. The system of claim 4, wherein the ones of the plurality of delegates comprises a voicemail agent and wherein an associated one of the plurality of options associated with the ones of the plurality of delegates comprises a voicemail option.

7. The system of claim 1, wherein the first application comprises an email application and wherein the first type of communication comprises textual content.

8. The system of claim 1, wherein the first application comprises a text chat application and wherein the first type of communication comprises textual content.

9. The system of claim 1, wherein the second application comprises a telephony application and wherein the second type of communication comprises audio content.

10. A method, comprising:
    accessing, in a data storage, a first record comprising a first out-of-office notification of a first user for a first application for communicating between nodes on a network utilizing a first type of communication;

parsing the first record to identify therein, a first delegate;
accessing a first address of the first delegate;
populating a first data structure having a first data field and a second data field, wherein the first data field is populated with an identity of the first delegate and the second data field is populated with the first address; and
generating, from the first data structure, a second record comprising an out-of-office notification for a second application for communicating between the nodes on the network utilizing a second type of communication, wherein a second out-of-office notification comprises a first option determined from the first data field;
presenting, to a device of a second node, the out-of-office notification for the second application; and
upon receiving the first option from the device of a second user, connecting the device of the second user to the first address of the second data field.

11. The method of claim 10, wherein the out-of-office notification for the second application is presented upon the device of the second user attempting to connect to the device of the first user.

12. The method of claim 11, further comprising, upon the device of the second user selecting the first option, disconnecting the device of the second user from the device of the first user.

13. The method of claim 10, wherein parsing the first record to identify the first delegate further comprises, parsing the first record to identify a plurality of delegates wherein ones of the plurality of delegates are associated with ones of a plurality of options.

14. The method of claim 13, wherein the second out-of-office notification comprises the plurality of options associated with a plurality of addresses for the nodes on a second network associated with the ones of the plurality of delegates.

15. The method of claim 13, wherein the ones of the plurality of delegates comprises a voicemail agent and wherein an associated one of the plurality of options associated with the ones of the plurality of delegates comprises a voicemail option.

16. The method of claim 10, wherein the first application comprises an email application and wherein the first type of communication comprises textual content.

17. The method of claim 10, wherein the first application comprises a text chat application and wherein the first type of communication comprises textual content.

18. The method of claim 10, wherein the second application comprises a telephony application and wherein the second type of communication comprises audio content.

19. A system, comprising:
means to access, in a data storage, a first record comprising a first out-of-office notification of a first user for a first application for communicating between nodes on a network utilizing a first type of communication;
means to parse the first record to identify therein, a first delegate;
means to access a first address of the first delegate;
means to populate a first data structure having a first data field and a second data field, wherein the first data field is populated with an identity of the first delegate and the second data field is populated with the first address; and
means to generate, from the first data structure, a second record comprising an out-of-office notification for a second application for communicating between nodes on a network utilizing a second type of communication, wherein a second out-of-office notification comprises a first option determined form the first data field;
means to present, to a device of a second node, the out-of-office notification for the second application; and
upon receiving the first option from the device of a second user, means to connect the device of the second user to the first address of the second data field.

20. The system of claim 19, wherein the first application comprises an email application utilizing a textual type of communication and the second application comprises a telephony application utilizing an encoded audio type of communication.

* * * * *